United States Patent
Coppola et al.

(10) Patent No.: US 12,494,687 B2
(45) Date of Patent: Dec. 9, 2025

(54) ROTOR ASSEMBLY WITH A COMPOSITE SLEEVE THAT IS OPTIMIZED FOR PRESS-FIT INSTALLATION

(71) Applicant: GM GLOBAL TECHNOLOGY OPERATIONS LLC, Detroit, MI (US)

(72) Inventors: Anthony Michael Coppola, Rochester Hills, MI (US); Derek Frei Lahr, Ann Arbor, MI (US); Alireza Fatemi, Canton, MI (US); Alan G. Holmes, Clarkston, MI (US); Michael B. Viola, Macomb Township, MI (US); Bradley Allen Newcomb, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 470 days.

(21) Appl. No.: 17/977,068

(22) Filed: Oct. 31, 2022

(65) Prior Publication Data
US 2024/0146131 A1    May 2, 2024

(51) Int. Cl.
*H02K 1/28* (2006.01)
*H02K 1/04* (2006.01)

(52) U.S. Cl.
CPC .............. *H02K 1/28* (2013.01); *H02K 1/04* (2013.01)

(58) Field of Classification Search
CPC .......... H02K 1/28; H02K 1/04; H02K 17/165; H02K 5/02; H02K 5/12; H02K 5/124; H02K 5/128; H02K 15/0012; H02K 15/12; H02K 2213/03
USPC .................................................... 310/156.28
See application file for complete search history.

(56) References Cited

U.S. PATENT DOCUMENTS

| | | | | |
|---|---|---|---|---|
| 4,729,160 | A * | 3/1988 | Brown | H02K 15/03 310/156.28 |
| 5,126,610 | A * | 6/1992 | Fremerey | F16C 32/0478 310/90 |
| 11,794,123 | B1 * | 10/2023 | Zhang | H02K 1/278 |
| 2010/0019626 | A1 * | 1/2010 | Stout | H02K 3/50 310/214 |
| 2016/0072344 | A1 * | 3/2016 | Durantay | H02K 1/02 29/598 |
| 2021/0218322 | A1 * | 7/2021 | Mihaila | H02K 5/203 |
| 2023/0118484 | A1 * | 4/2023 | Sasaki | H02K 1/278 310/156.31 |
| 2023/0188024 | A1 * | 6/2023 | Tang | H02K 7/09 |
| 2023/0268814 | A1 * | 8/2023 | Garrard | H02K 1/278 310/156.01 |
| 2023/0338867 | A1 * | 10/2023 | Zhang | A63H 29/22 |

OTHER PUBLICATIONS

U.S. Appl. No. 17/445,739, filed Aug. 24, 2021, Fatemi et al.
U.S. Appl. No. 17/537,123, filed Nov. 29, 2021, Coppola et al.
U.S. Appl. No. 17/537,563, filed Nov. 30, 2021, Coppola et al.

* cited by examiner

*Primary Examiner* — Maged M Almawri

(57) ABSTRACT

A rotor for an electric machine includes a magnetic core configured for arrangement on a shaft. An end ring is arranged on opposite axial ends of the magnetic core. A composite sleeve includes an annular body including an inner surface and an outer surface, and a polymer matrix encapsulating circumferentially oriented fibers. The composite sleeve includes a first tapered portion on the inner surface arranged adjacent to an axial end thereof and configured to facilitate press-fitting of the composite sleeve onto the rotor.

20 Claims, 5 Drawing Sheets

ROTOR ASSEMBLY WITH A COMPOSITE SLEEVE THAT IS OPTIMIZED FOR PRESS-FIT INSTALLATION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to electric machines, and more particularly to a rotor including a press-fit composite sleeve for an electric machine.

Electric vehicles (EVs) such as battery electric vehicles (BEVs), hybrid vehicles, and/or fuel cell vehicles include one or more electric machines and a battery system. The battery system provides power to the one or more electric machines and receives power from the one or more electric machines and/or a utility. The battery system includes one or more battery cells, modules and/or packs. A power control system is used to control charging and/or discharging of the battery system during charging and/or driving.

The electric machines include a rotor and stator. During manufacturing of the electric machines, a reinforcing sleeve may be press-fit onto an outer surface of the rotor to prevent expansion of the rotor assembly during operation. The reinforcing sleeve may be damaged during the press-fit process.

SUMMARY

A rotor for an electric machine includes a magnetic core configured for arrangement on a shaft. An end ring is arranged on opposite axial ends of the magnetic core. A composite sleeve includes an annular body including an inner surface and an outer surface, and a polymer matrix encapsulating circumferentially oriented fibers. The composite sleeve includes a first tapered portion on the inner surface arranged adjacent to an axial end thereof and configured to facilitate press-fitting of the composite sleeve onto the rotor.

In other features, the end ring includes a second tapered portion configured to bias the first tapered portion to facilitate press-fitting of the composite sleeve onto the rotor. A taper angle of the first tapered portion and the second tapered portion is in a range from 0.1° to 5°.

In other features, the annular body comprises an outer layer including greater than or equal to 50% axial fibers oriented at an angle greater than 45° of a circumferential direction, a middle layer comprising greater than or equal to 80% circumferential fibers oriented at an angle less than or equal to 5° of the circumferential direction, and an inner layer including greater than 50% axial fibers oriented at an angle greater than 45° of a circumferential direction.

In other features, the inner layer further includes a filler configured to reduce friction of the inner layer when press-fitting the composite sleeve onto the rotor. The filler is selected from a group consisting of silicon dioxide ($SiO_2$), calcium carbonate ($CaCO_3$), aluminum oxide ($Al_2O_3$), titanium dioxide ($TiO_2$), graphene and graphene nanoplatelets, zirconium dioxide ($ZrO_2$), and molybdenum disulfide ($MoS_2$), and combinations thereof. A physical vapor deposition coating is arranged on the inner surface of the composite sleeve. The middle layer comprises more than 80% of a thickness of the composite sleeve after grinding. The composite sleeve has a diameter in a range from 0.5 to 5 mm after grinding.

In other features, the end ring has an axial thickness. The second tapered portion extends in an axial direction from a flat portion arranged parallel to an axial direction. The second tapered portion of the end ring extends 75% to 95% of the axial thickness of the end ring and terminates at the flat portion. The flat portion has a diameter greater than or equal to a diameter of the magnetic core.

A composite sleeve for a rotor of an electric machine includes an annular body including an inner surface, an outer surface, and a reinforcing fibers embedded in a polymer matrix. A tapered portion formed on a first axial end of the inner surface and configured to facilitate press-fitting of the composite sleeve onto the rotor.

In other features, taper angle of the tapered portion is in a range from 0.1° to 5°. Prior to grinding, the annular body comprises an outer layer including greater than or equal to 50% axial fibers oriented at an angle greater than 45° of a circumferential direction, a middle layer comprising greater than or equal to 80% circumferential fibers oriented at an angle less than or equal to 5° of the circumferential direction, and an inner layer including greater than 50% axial fibers oriented at an angle greater than 45° of a circumferential direction.

In other features, the inner layer further includes a filler configured to reduce friction of the inner layer when press-fitting the composite sleeve onto the rotor. The filler is selected from a group consisting of silicon dioxide ($SiO_2$), calcium carbonate ($CaCO_3$), aluminum oxide ($Al_2O_3$), titanium dioxide ($TiO_2$), graphene and graphene nanoplatelets, zirconium dioxide ($ZrO_2$), and molybdenum disulfide ($MoS_2$), and combinations thereof. The filler comprises nano-sized particles. The filler comprises 1 to 10 wt % of the inner layer. The middle layer comprises more than 80% of a thickness of the composite sleeve after grinding. The composite sleeve has a diameter in a range from 0.5 to 5 mm. A ring is attached to the outer surface of a pressed end of the composite sleeve.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A rotor assembly according to the present disclosure includes a rotor magnetic core, one or more end-rings, a shaft, and a composite sleeve. The end-rings and/or the composite sleeve include a tapered region on at least one axial end.

The composite sleeve includes an annular body. In some examples, the annular body including a middle layer including greater than 80%, 90% or 95% circumferential fibers (e.g, 100%). Radially inner and outer layers include greater than 50% axial fibers arranged in radially inner and outer layers. In some examples, the circumferential fibers are oriented at an angle less than or equal to 5 degrees of a circumferential axis. In some examples, the axial fibers are oriented at an angle that is greater than or equal to 45 degrees from the circumferential axis. In some examples, greater than 80% of the fibers in the composite sleeve are circumferential and the remaining fibers are axial fibers.

In some examples, the outer layer includes axial fibers that are used to increase axial sleeve strength during sleeve installation. In some examples, the axially oriented fibers and their composite is different than the circumferential fibers and their composite. In some examples, the middle layer includes carbon fibers in a polymer matrix. In some examples, the inner and outer layers include axial fibers (e.g., glass fibers) in the same polymer matrix or a different polymer matrix.

In some examples, one or both radially outer, axial edges of the end ring and/or one or both radially inner, axial edges of the composite sleeve are tapered. In some examples, a taper angle is in a range from 0.1° to 5°. In some examples, the taper angle is in a range from 1° to 2°.

In some examples, a radius at a corner between the taper and adjacent axially extending straight regions is in a range between 10 mm and 500 mm. In some examples, the radius is in a range between 100 mm and 200 mm. In some examples, the axial taper length is in a range between 75-95% of an axial thickness of the end ring.

In some examples, the ratio between the reduced pre-stress and the normal pre-stress of the composite sleeve is in a range from 50-90%. In some examples, the outer surface of the magnetic core and the end ring is made co-planar by using a grinding or machining operation before the addition of the sleeve by pre-fitting.

In some examples, a pressed end of the composite sleeve includes a ring of sacrificial supporting material to prevent crushing of the sleeve during installation using the press fitting tool.

In some examples, the inner layer of the composite sleeve is optimized to reduce friction and includes greater than 50% fibers oriented in the axial direction. In some examples, the inner layer of the composite sleeve includes a filler to reduce friction. In some examples, the inner surface of the sleeve includes a friction reducing coating applied using physical vapor deposition (PVD).

Figure 2:
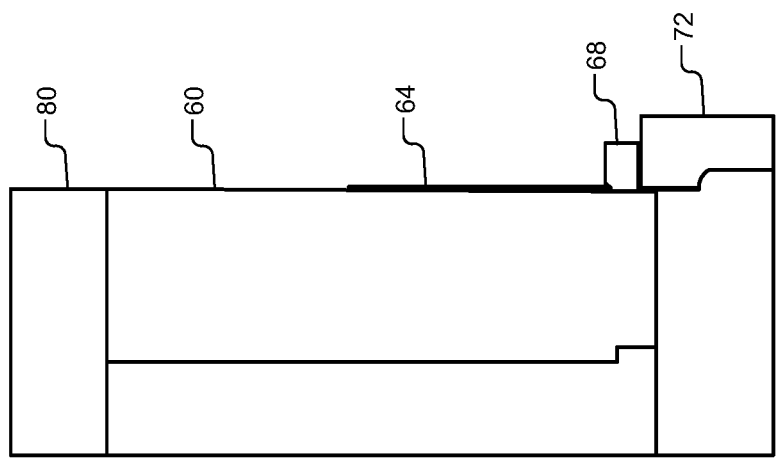
FIG. 2 is a partial, side cross sectional view of an example of a rotor arranged on a press fit tool prior to press fitting.
Figure 1:
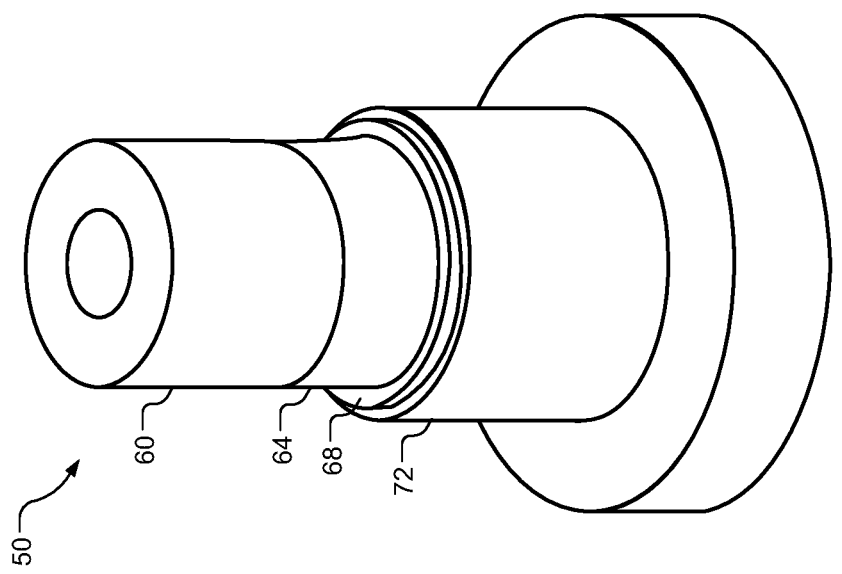
FIG. 1 is a perspective view of an example of a press fit tool for a composite sleeve.

Referring now to FIGS. 1 and 2, an example of a press-fit tool 50 for a composite sleeve 64 is shown. In FIG. 1, the press-fit tool 50 includes a tapered stretching tool 60, a pressing ring 68, and a pressing tool 72. The pressing tool 72 moves the composite sleeve 64 axially relative to the tapered stretching tool 60. In FIG. 2, a rotor assembly 80 is arranged on the tapered stretching tool 60 prior to press fitting.

In some examples, the tapered stretching tool 60 has an increasing taper (e.g., in a range from 1° to 5°) from an initial diameter (e.g., at a lower end) to a final diameter (e.g., on an upper end). The initial diameter of the tapered stretching tool 60 allows the composite sleeve 64 to be inserted easily. The final diameter of the tapered stretching tool 60 is greater than or equal to the diameter of the rotor core.

The rotor assembly 80 is arranged next to the final diameter of the tapered stretching tool 60 prior to press fitting. The pressing tool 72 moves the composite sleeve 64 in a sleeve installation direction (upwardly in FIGS. 1 and 2) onto the rotor assembly 80. As the composite sleeve 64 moves towards and onto the rotor assembly 80, the composite sleeve 64 is stretched over the rotor assembly 80.

An annular body of the composite sleeve 64 is stretched in a radial direction during installation to pre-tension the composite sleeve 64. The pre-tension allows the composite sleeve 64 to produce radially inward pressure on the rotor assembly 80 to limit or prevent an outer diameter of the rotor assembly 80 from increasing during rotation of the rotor at high speed. Limiting radial expansion of the rotor assembly 80 prevents the rotor assembly 80 from hitting a stator of the electric machine and/or allows a narrower air gap to be used between the rotor assembly 80 and the stator, which improves motor performance.

During press fit installation, the composite sleeve 64 can fail as a result of crushing near the pressing tool 72 or due to tensile failure, which typically initiates at a leading edge of the composite sleeve 64 due to edge effects. Composite sleeves subjected to compressive loading can undergo a progressive failure (or crushing). Once crushing is initiated, the crush zone grows along with the displacement of the loading surface. During installation of the composite sleeve, normal stress transverse to fibers increases and may cause intra-ply cracks and shear stress increases and may cause delamination. Either of these stresses can cause unraveling of the fibers. The composite sleeve according to the present disclosure maximizes the compressive strength in the area of contact to prevent onset of crushing.

Figure 3:
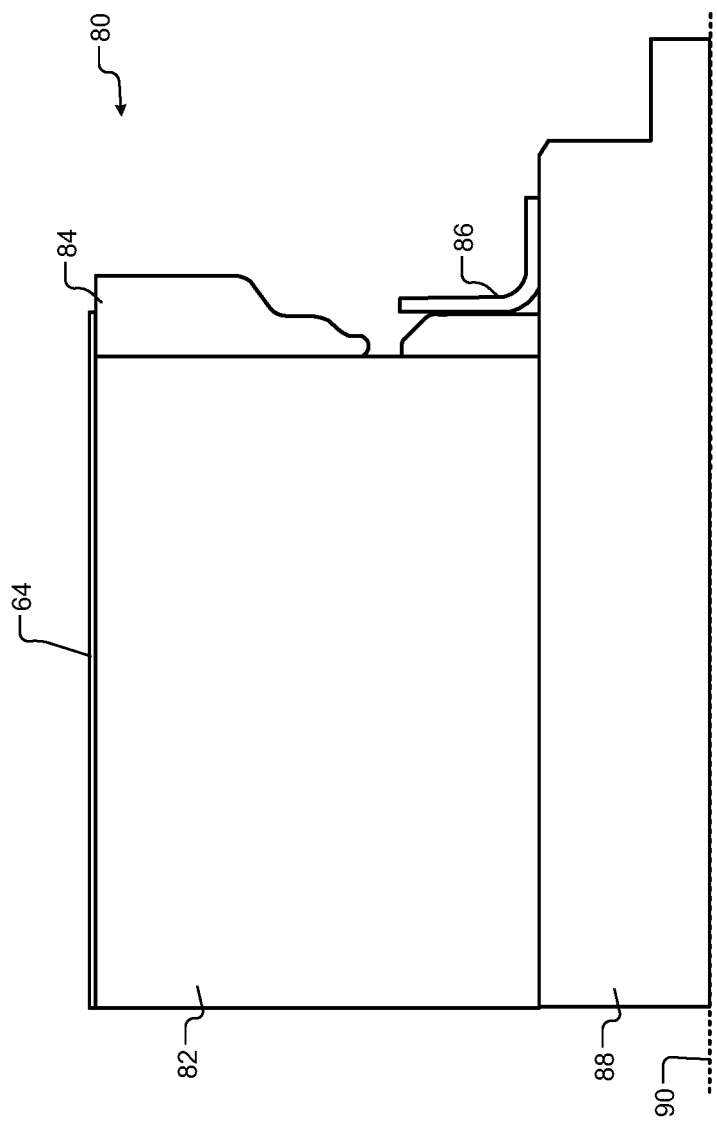
FIG. 3 is a side cross sectional view of an example of a rotor including a press fit composite sleeve.

Referring now to FIG. 3, the rotor assembly 80 includes a magnetic core 82 including electrical steel laminations and permanent magnets (not shown). The rotor assembly 80 includes an end ring 84 and a retaining ring 86. The rotor assembly 80 further includes the composite sleeve 64 press-fit onto a radially outer surface of the magnetic core 82. The rotor assembly 80 is mounted on a shaft 88 that rotates about an axis of rotation 90. In some examples, the sleeve overlaps the end ring 84 by a predetermined percentage of an axial thickness of the end ring. In some examples, the predetermined percentage is greater than or equal to 50%. In other examples, less overlap or no overlap is used.

Figure 4:
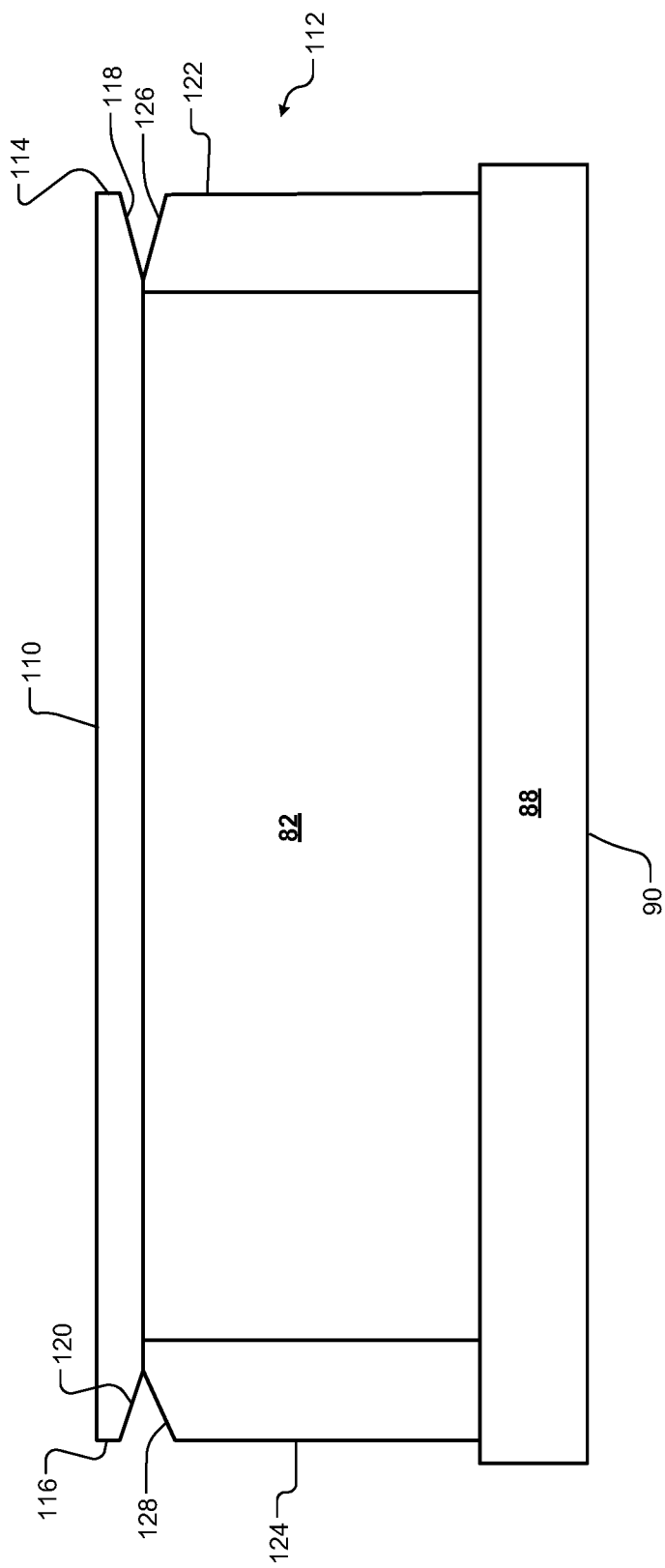
FIG. 4 is a side cross sectional view of an example of a composite sleeve press fit onto a rotor according to the present disclosure.

Referring now to FIG. 4, a composite sleeve 110 according to the present disclosure is shown after being press fit onto a rotor assembly 112. In some examples, one or both axial ends 114 and 116 of the composite sleeve 110 include tapered regions 118 and 120, respectively. The tapered regions 118 and 120 taper from an inner surface to the axial ends 114 and 116, respectively, that are located at axial sides thereof.

The rotor assembly 112 includes end rings 122 and 124 arranged at opposite axial ends thereof. In some examples, one or both of the end rings 122 and 124 also include tapered regions 126 and 128. The tapered regions 126 and 128 taper at radially outer, axial edge of the end rings 122 and 124, respectively.

Circumferential stress in one or both of the axial ends 114 and 116 of the composite sleeve 110 is reduced by the tapered regions 118 and 120 of the composite sleeve 110 or the tapered regions 126 and 128 of the end rings 122 and 124, respectively. While tapered regions are shown on both axial ends 114 and 116 of the composite sleeve 110 and the end rings 122 and 124, the tapered regions can be located on one side (e.g., tapered region 118 and/or tapered region 126) or on one end of the composite sleeve or on one of the end rings. In some examples, the end rings 122 and 124 are made of stainless steel instead of aluminum to facilitate grinding.

Figure 5:
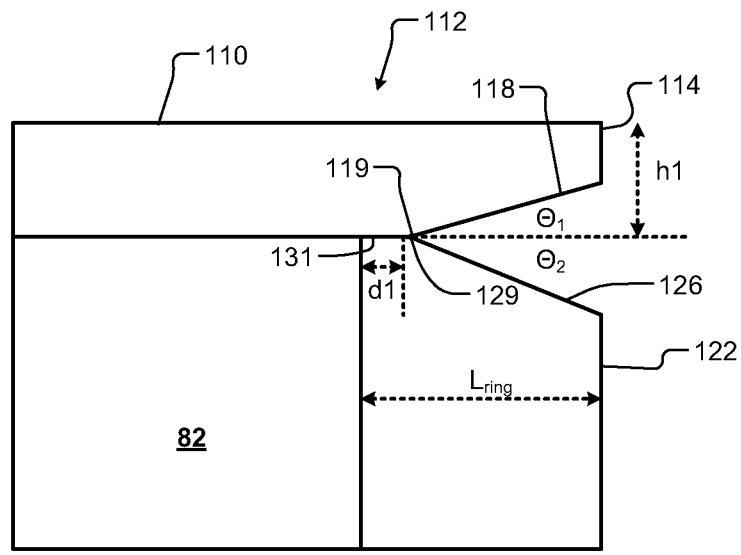
FIG. 5 is an enlarged side cross sectional view of an example of a composite sleeve press fit onto a rotor according to the present disclosure.

Referring now to FIG. 5, the composite sleeve 110 is shown after being press fit onto a rotor. In some examples, the tapered region 126 extends between 75-100% of an axial length $L_{ring}$ of the end ring 122. In some examples, the tapered region 118 does not overlap the magnetic core 82. In some examples, the tapered regions 118 and 126 are symmetric.

In some examples, taper angles $\Theta_1$ and $\Theta_2$ are in a range from 0.1 to 5 degrees. In some examples, the taper angles $\Theta_1$ and $\Theta_2$ are in a range from 1 to 2 degrees. In some examples, the height h1 of the composite sleeve 110 is in a range from 0.5 to 5 mm. In some examples, the height h1 of the composite sleeve 110 is in a range from 1 to 3 mm.

In some examples, the composite sleeve 110 and/or the end ring 122 include radiused corners 119 and 129, respectively. In some examples, radiused corners 119 and 129 have a radius in a predetermined range from 10 to 500 mm. In some examples, radiused corners 119 and 129 have a radius in a predetermined range from 100 to 200 mm. In some examples, the end ring 122 includes a flat portion 131 having an axial length dl in a range from 0% to 25% of the axial thickness of the end ring. In some examples, the axial length dl is in a range from 5% to 20% of the axial thickness of the end ring.

Figure 6:
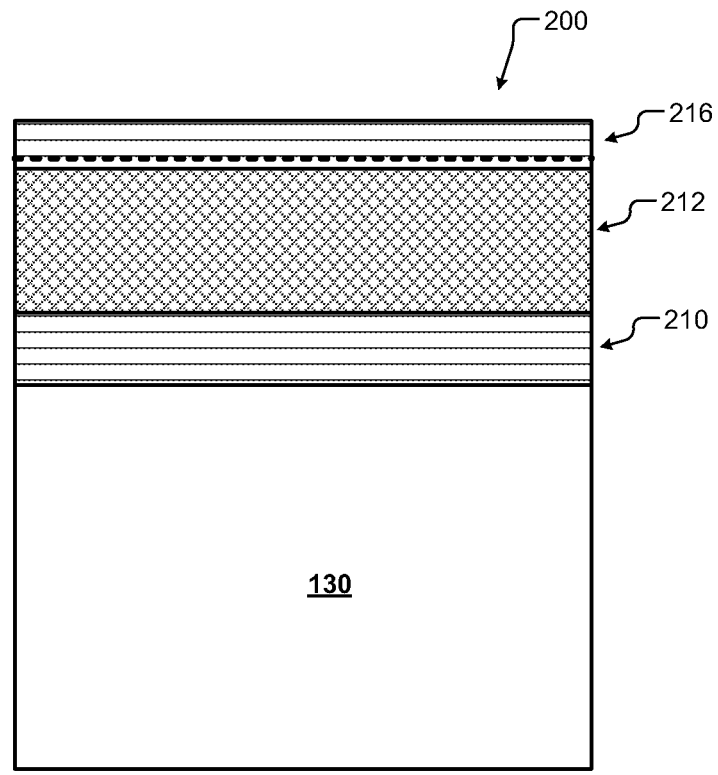
FIG. 6 is a side cross-sectional view of an example of a composite sleeve with different layers according to the present disclosure.

Referring now to FIG. 6, an example of a composite sleeve 200 is shown. To aid in the installation, the composite sleeve 200 includes an outer layer 216, a middle layer 212, and an inner layer 210. In some examples, the outer layer 216 is ground to adjust an outer profile of the composite sleeve. The outer layer 216 and the inner layer 210 include greater than 50% axially oriented fibers (e.g., glass fibers) and the middle layer 212 includes greater than 80% circumferential oriented fibers (e.g., carbon fibers).

In some examples, the outer layer 216 and the inner layer 210 include carbon or glass fibers (glass fibers reduce cost). In some examples, the inner layer 210 includes a friction-optimized composite, where the matrix, fillers, and/or fibers are designed to minimize friction.

In some examples, post-installation grinding is used to remove some or all of the outer layer 216 to achieve tighter surface tolerances and reduce effective sleeve thickness to minimize an electromagnetic air gap between the rotor and the stator. In some examples, the outer layer 216 includes unidirectional fibers or fabric (weave or braid) where at least 50% of the fibers in the outer layer 216 are arranged in the axial direction (in other words, greater than 45° from the circumferential axis). In some examples, the inner layer 210 includes unidirectional fibers or fabric (weaver or braid). In some examples, at least 50% of the fibers in the inner layer 210 are arranged in an axial direction (in other words, greater than 45° from the circumferential axis). In some examples, the inner layer 210 comprises less than 20% of the post grinding sleeve thickness.

In some examples, the outer layer 216 comprises less than 50% of the pre-grinding thickness of the composite sleeve 200. In some examples, the grinding eliminates between 90%-100% of the outer layer 216.

With respect to the middle layer 212, greater than 80%, 90% or 95% of the fibers are arranged in a circumferential direction. In some examples, the middle layer 212 includes carbon fibers. In some examples, the fibers in the middle layer 212 are wound at an angle less than 5° from a circumferential direction.

Figure 7:
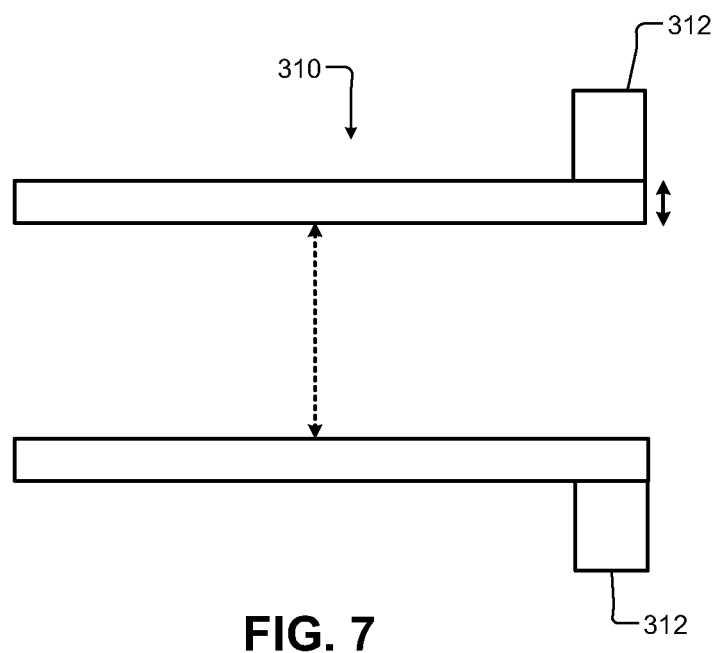
FIG. 7 is a side cross-sectional view of an example of a composite sleeve with a reinforcing ring according to the present disclosure.

Referring now to FIG. 7, a composite sleeve 300 includes a ring 312 that increases thickness of the composite sleeve to increase strength and support the composite sleeve 300 during installation using the pressing ring. The ring 312 is trimmed or removed after installation of the composite sleeve onto the rotor. In some examples, heat sensitive adhesive or resin is used to attach the ring 312 to the composite sleeve 300. After installation, heat is used to heat the compositive sleeve 300 and the ring 312 and allow the adhesive to melt for removal of the ring 312.

Figure 8:
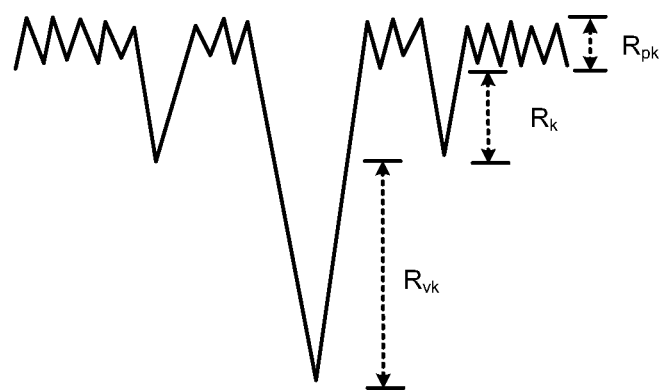
FIG. 8 is an enlarged side cross-sectional view of an example of a surface of a composite sleeve according to the present disclosure.

Referring now to FIG. 8, an enlarged side cross-sectional view of an example of an inner surface of a composite sleeve is shown. A grinder with a predetermined profile is used to alter an inner surface of the composite sleeve. In some examples, the grinder profile is used to define various features.

Grinding can be used to define $R_{pk}$, $R_k$, and $R_{vk}$ on an inner diameter of the composite sleeve. $R_{pk}$ is less than or equal to 0.01 μm to provide very smooth surface to reduce carbon fibers being removed on the inner diameter when the composite sleeve is pressed onto the rotor. $R_k$ is in a range from 0.2-0.4 μm. The surface finish $R_k$ provides a low coefficient of friction (COF) at the interface with the rotor. When $R_{vk}$ is greater than 1.0 μm, lubricant can be held to reduce friction during application.

In some examples, the lubricant comprises a very low viscosity oil similar to sewing machine or firearm oil for press fitting. Alternately, a friction modifier or wear additive (e.g., moly or Teflon®) may be used. These lubricants flow easier and have less viscous drag between the motor and CF sleeve (as compared to dry lubricant or ATF fluid).

In some examples, the inner layer including axial fibers comprises materials that are optimized for reduced friction, such as changing the matrix, fillers, or fiber material/orientation. In some examples, the polymer matrix (e.g., with low friction) is selected from a group consisting of polyetheretherketone (PEEK), polytetrafluoroethylene (PTFE), polybenzimidazole, polyamides, polycyclopentadiene, epoxy, and combinations thereof.

Lower friction can be obtained using polyethylene fibers such as Spectra®, Dyneema®, polybenzimidazole fibers, carbon fibers, and/or combinations thereof. Most fibers have reduced friction when oriented (at least partially) along the axial direction rather than the circumferential direction.

In additional, friction of the composite sleeve can be reduced using fillers. In some examples, the filler is selected from a group consisting of silicon dioxide ($SiO_2$), calcium carbonate ($CaCO_3$), aluminum oxide ($Al_2O_3$), titanium dioxide ($TiO_2$), graphene and graphene nanoplatelets, zirconium dioxide ($ZrO_2$), molybdenum disulfide ($MoS_2$), and combinations thereof. For example, micro-sized fillers or nano-sized fillers can be used. In some examples, the fillers comprise 1 to 10 wt % (e.g., 5 wt %) of the matrix.

In other examples, the composite sleeve and/or an inner diameter of the composite sleeve can be coated using physical vapor deposition (PVD) to reduce friction.

Examples of PVD coatings include DLC (Carboglide®) or TB30, TB31, TB40, TB41 and TB42 (Tribobond®).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A rotor for an electric machine, comprising:
a magnetic core configured for arrangement on a shaft;
an end ring arranged on opposite axial ends of the magnetic core, the end ring having an axial thickness; and
a composite sleeve comprising an annular body including an inner surface and an outer surface, and a polymer matrix encapsulating circumferentially oriented fibers,
wherein the composite sleeve includes a first tapered portion on the inner surface arranged adjacent to an axial end thereof and configured to facilitate press-fitting of the composite sleeve onto the rotor,
wherein the end ring includes a second tapered portion configured to bias the first tapered portion to facilitate press-fitting of the composite sleeve onto the rotor,
wherein the second tapered portion extends in an axial direction from a flat portion arranged parallel to an axial direction,
wherein the second tapered portion of the end ring extends 75% to 95% of the axial thickness of the end ring and terminates at the flat portion, and
wherein the flat portion has a diameter greater than or equal to a diameter of the magnetic core.

2. The rotor of claim 1, wherein a taper angle of the first tapered portion and the second tapered portion is in a range from 0.1° to 5°.

3. The rotor of claim 1, wherein the composite sleeve has a diameter in a range from 0.5 to 5 mm after grinding.

4. The rotor of claim 1, wherein the annular body comprises:
an outer layer including greater than or equal to 50% axial fibers oriented at an angle greater than 45° of a circumferential direction;
a middle layer comprising greater than or equal to 80% circumferential fibers oriented at an angle less than or equal to 5° of the circumferential direction; and
an inner layer including greater than 50% axial fibers oriented at an angle greater than 45° of a circumferential direction.

5. The rotor of claim 4, further comprising a physical vapor deposition coating on the inner surface of the composite sleeve.

6. The rotor of claim 4, wherein the middle layer comprises more than 80% of a thickness of the composite sleeve after grinding.

7. The rotor of claim 4, wherein the inner layer further includes a filler configured to reduce friction of the inner layer when press-fitting the composite sleeve onto the rotor.

8. The rotor of claim 7, wherein the filler is selected from a group consisting of silicon dioxide ($SiO_2$), calcium carbonate ($CaCO_3$), aluminum oxide ($Al_2O_3$), titanium dioxide ($TiO_2$), graphene and graphene nanoplatelets, zirconium dioxide ($ZrO_2$), and molybdenum disulfide ($MoS_2$), and combinations thereof.

9. A rotor of an electric machine, comprising:
a magnetic core configured for arrangement on a shaft;
an end ring arranged on opposite axial ends of the magnetic core, the end ring having an axial thickness; and
a composite sleeve comprising an annular body including an inner surface, an outer surface, reinforcing fibers embedded in a polymer matrix, and a first tapered portion formed on an axial end of the inner surface and configured to facilitate press-fitting of the composite sleeve onto the rotor,
wherein the end ring includes a second tapered portion configured to bias the first tapered portion to facilitate press-fitting of the composite sleeve onto the rotor,
wherein the second tapered portion extends in an axial direction from a flat portion arranged parallel to an axial direction,
wherein the second tapered portion of the end ring extends 75% to 95% of the axial thickness of the end ring and terminates at the flat portion, and
wherein the flat portion has a diameter greater than or equal to a diameter of the magnetic core.

10. The rotor of claim 9, wherein a taper angle of the first tapered portion is in a range from 0.1° to 5°.

11. The rotor of claim 9, wherein the composite sleeve has a diameter in a range from 0.5 to 5 mm.

12. The rotor of claim 9, further comprising a ring attached to the outer surface of a pressed end of the composite sleeve.

13. The rotor of claim 9, wherein, prior to grinding, the annular body comprises:
- an outer layer including greater than or equal to 50% axial fibers oriented at an angle greater than 45° of a circumferential direction;
- a middle layer comprising greater than or equal to 80% circumferential fibers oriented at an angle less than or equal to 5° of the circumferential direction; and
- an inner layer including greater than 50% axial fibers oriented at an angle greater than 45° of a circumferential direction.

14. The rotor of claim 13, wherein the inner layer further includes a filler configured to reduce friction of the inner layer when press-fitting the composite sleeve onto the rotor.

15. The rotor of claim 14, wherein the filler is selected from a group consisting of silicon dioxide ($SiO_2$), calcium carbonate ($CaCO_3$), aluminum oxide ($Al_2O_3$), titanium dioxide ($TiO_2$), graphene and graphene nanoplatelets, zirconium dioxide ($ZrO_2$), and molybdenum disulfide ($MoS_2$), and combinations thereof.

16. The rotor of claim 14, wherein the filler comprises nano-sized particles.

17. The rotor of claim 14, wherein the filler comprises 1 to 10 wt % of the inner layer.

18. The rotor of claim 14, wherein the middle layer comprises more than 80% of a thickness of the composite sleeve after grinding.

19. A rotor of an electric machine, comprising:
- a magnetic core configured for arrangement on a shaft;
- an end ring arranged on opposite axial ends of the magnetic core, the end ring having an axial thickness; and
- a composite sleeve comprising an annular body including an inner surface, an outer surface, a polymer matrix having fibers embedded therein, and a first tapered portion formed on an axial end of the inner surface and configured to facilitate press-fitting of the composite sleeve onto the rotor,
- the end ring including a flat portion arranged parallel to an axial direction and a second tapered portion configured to bias the first tapered portion, the second tapered portion extending in the axial direction from the flat portion,
- wherein the second tapered portion of the end ring extends at least 75% of the axial thickness of the end ring, and terminates at the flat portion and an end of the first tapered portion of the composite sleeve, and
- wherein the flat portion has a diameter greater than or equal to a diameter of the magnetic core.

20. The rotor of claim 19, wherein a taper angle of the first tapered portion and the second tapered portion is in a range from 0.1° to 5°.

* * * * *